United States Patent
Johnson et al.

(10) Patent No.: US 9,552,117 B2
(45) Date of Patent: Jan. 24, 2017

(54) CAPACITIVE TOUCH PANEL WITH INCREASED SCAN FREQUENCY USING DYNAMIC PHASE COMPENSATION

(71) Applicant: QUALCOMM Incorporated, San Diego, CA (US)

(72) Inventors: David Johnson, Cupertino, CA (US); Guozhong Shen, San Jose, CA (US); Firooz Massoudi, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 14/580,543

(22) Filed: Dec. 23, 2014

(65) Prior Publication Data

US 2015/0370366 A1 Dec. 24, 2015

Related U.S. Application Data

(60) Provisional application No. 62/014,759, filed on Jun. 20, 2014.

(51) Int. Cl.
  *G06F 3/044* (2006.01)
  *G06F 3/041* (2006.01)

(52) U.S. Cl.
  CPC .............. *G06F 3/044* (2013.01); *G06F 3/0418* (2013.01); *G06F 3/0416* (2013.01)

(58) Field of Classification Search
  CPC ....... G06F 3/044; G06F 3/0416; G06F 3/0418
  See application file for complete search history.

(56) References Cited

U.S. PATENT DOCUMENTS

| 5,442,373 | A  | * | 8/1995  | Nomura   | G06F 3/0418 |
|           |    |   |         |          | 345/104 |
| 9,235,280 | B1 | * | 1/2016  | Mohindra | G06F 3/041 |
| 9,354,264 | B2 | * | 5/2016  | Schwartz | G06F 3/0416 |
| 2008/0043046 | A1 | * | 2/2008 | Hong | G09G 3/3216 |
|           |    |   |         |          | 345/691 |
| 2008/0162997 | A1 | * | 7/2008 | Vu   | G06F 3/03545 |
|           |    |   |         |          | 714/27 |
| 2009/0266621 | A1 | * | 10/2009 | Huang | G06F 3/044 |
|           |    |   |         |          | 178/18.01 |
| 2011/0096020 | A1 | * | 4/2011 | Cranfill | G06F 3/0418 |
|           |    |   |         |          | 345/174 |

(Continued)

*Primary Examiner* — Viet Pham
*Assistant Examiner* — Darlene M Ritchie
(74) *Attorney, Agent, or Firm* — Weaver Austin Villeneuve & Sampson LLP

(57) ABSTRACT

A system includes a first group of transmit electrodes configured to be driven from a first side of a capacitive touch panel and a second group of transmit electrodes configured to be driven from a second side of the panel. The system also includes receive electrodes and a controller operatively coupled with the transmit electrodes and the receive electrodes. The controller is operable to dynamically configure the transmit electrodes and the receive electrodes to compensate for phase delays introduced by driving the transmit electrodes from different sides of the panel. A method includes driving a first group of transmit electrodes from a first side of a capacitive touch panel, driving a second group of transmit electrodes from a second side of the panel, and dynamically configuring the transmit electrodes and receive electrodes to compensate for phase delays introduced by driving the transmit electrodes from different sides of the panel.

20 Claims, 4 Drawing Sheets

(56) References Cited

U.S. PATENT DOCUMENTS

Figure 1:
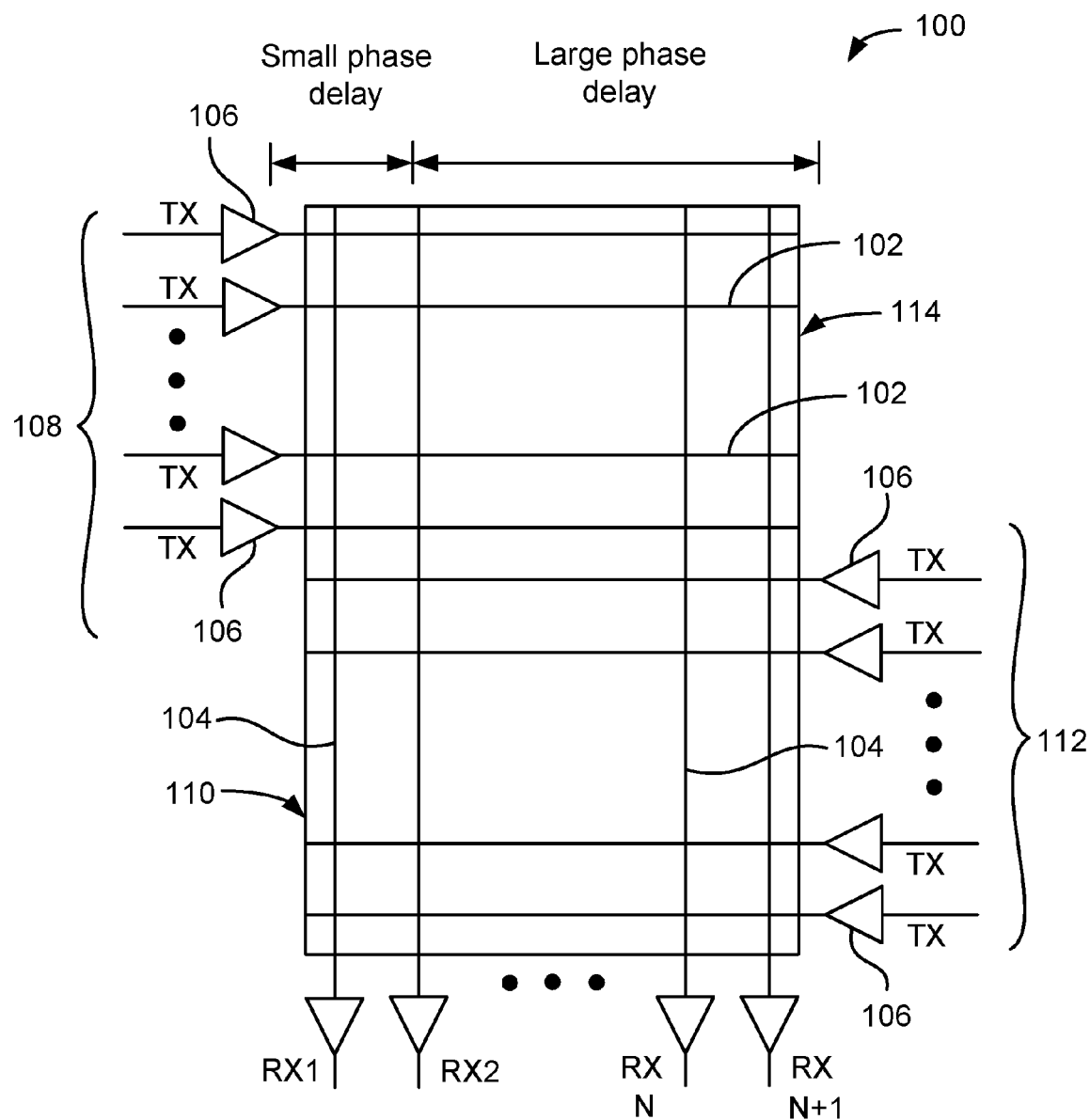

| | | | | |
|---|---|---|---|---|
| 2011/0216033 A1* | 9/2011 | Mamba | G06F 3/0418 | 345/174 |
| 2012/0013565 A1* | 1/2012 | Westhues | G06F 3/0418 | 345/174 |
| 2012/0050180 A1* | 3/2012 | King | G06F 3/0416 | 345/173 |
| 2012/0056841 A1* | 3/2012 | Krenik | G06F 3/044 | 345/174 |
| 2013/0176276 A1* | 7/2013 | Shepelev | G06F 3/044 | 345/174 |
| 2014/0204053 A1* | 7/2014 | Crandall | G06F 3/0418 | 345/174 |
| 2014/0267129 A1* | 9/2014 | Rebeschi | G06F 3/0418 | 345/174 |
| 2015/0022494 A1* | 1/2015 | Azumi | G06F 3/044 | 345/174 |
| 2015/0102827 A1* | 4/2015 | Byun | G06F 3/044 | 324/679 |
| 2015/0169121 A1* | 6/2015 | Yao | G06F 3/044 | 345/174 |
| 2015/0261340 A1* | 9/2015 | Krah | G06F 3/044 | 345/174 |
| 2015/0309610 A1* | 10/2015 | Rabii | G06F 3/044 | 345/174 |
| 2015/0346903 A1* | 12/2015 | O'Connor | G09G 5/003 | 345/173 |
| 2016/0034070 A1* | 2/2016 | Hayashi | G06F 3/044 | 345/174 |
| 2016/0147331 A1* | 5/2016 | Qin | G06F 3/044 | 345/174 |

* cited by examiner

CAPACITIVE TOUCH PANEL WITH INCREASED SCAN FREQUENCY USING DYNAMIC PHASE COMPENSATION

CROSS-REFERENCE TO RELATED APPLICATIONS

The present application claims the benefit under 35 U.S.C. §119(e) of U.S. Provisional Application Ser. No. 62/014,759, filed Jun. 20, 2014, and titled "CAPACITIVE TOUCH PANEL WITH INCREASED SCAN FREQUENCY," which is herein incorporated by reference in its entirety.

BACKGROUND

A touch panel is a human machine interface (HMI) that allows an operator of an electronic device to provide input to the device using an instrument such as a finger, a stylus, and so forth. For example, the operator may use his or her fingers to manipulate images on an electronic display, such as a display attached to a mobile computing device, a personal computer (PC), a terminal connected to a network, and so forth. In some cases, the operator may use two or more fingers simultaneously to provide unique commands, such as a zoom command, executed by moving two fingers away from one another; a shrink command, executed by moving two fingers toward one another; and so forth. In other cases, the operator may use a stylus to provide commands via a touch panel.

A touch screen is an electronic visual display that incorporates a touch panel overlying a display to detect the presence and/or location of a touch within the display area of a screen. The operator can control the display using simple or multi-touch gestures by touching the screen with a stylus and/or one or more fingers. Touch screens are common in devices such as all-in-one computers, tablet computers, satellite navigation devices, gaming devices, and smartphones. A touch screen enables an operator to interact directly with information that is displayed by the display underlying the touch panel, rather than indirectly with a pointer controlled by a mouse or touchpad. The operator can use the touch screen to react to what is displayed and to control how it is displayed. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electric field, measurable as change in capacitance.

SUMMARY

A system includes a first group of transmit electrodes configured to be driven from a first side of a capacitive touch panel and a second group of transmit electrodes configured to be driven from a second side of the capacitive touch panel. The system also includes receive electrodes and a controller operatively coupled with the transmit electrodes and the receive electrodes. The controller is operable to dynamically configure the transmit electrodes and the receive electrodes to compensate for phase delays introduced by driving the transmit electrodes from different sides of the capacitive touch panel. A method includes driving a first group of transmit electrodes from a first side of a capacitive touch panel, driving a second group of transmit electrodes from a second side of the capacitive touch panel, and dynamically configuring the transmit electrodes and receive electrodes to compensate for phase delays introduced by driving the transmit electrodes from different sides of the capacitive touch panel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIG. 1 is a diagrammatic illustration of a capacitive touch panel, where a first group of transmit electrodes are driven from the first side of the touch panel, a second group of transmit electrodes are driven from the second side of the touch panel, and receive electrodes that intersect with the transmit electrodes are synchronized with the transmit electrodes in accordance with an example embodiment of the present disclosure.

Figure 2:
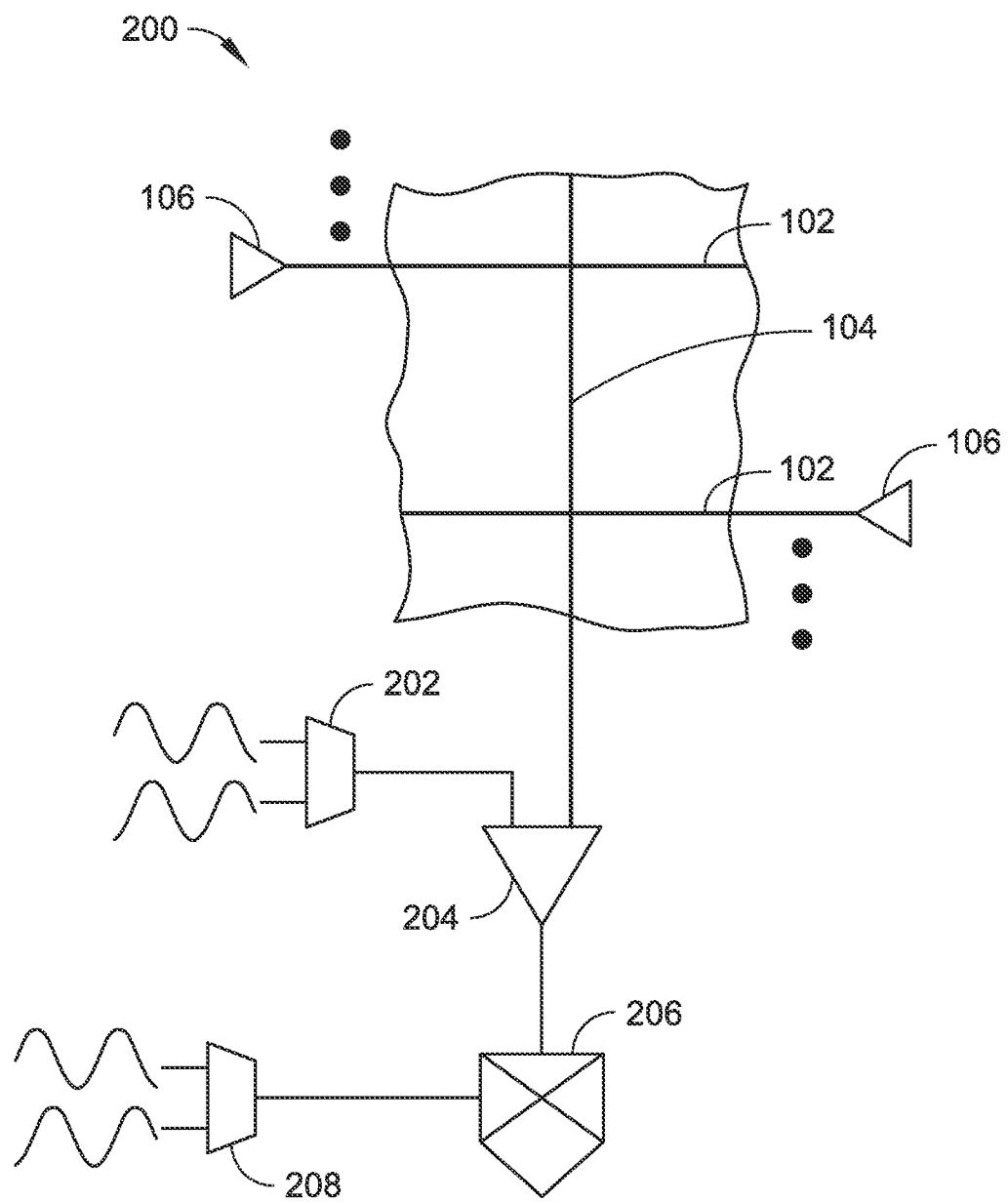

FIG. 2 is a partial diagrammatic illustration of circuitry for a capacitive touch panel receive channel (e.g., for the capacitive touch panel illustrated in FIG. 1), where the receive channel circuitry can be reconfigured during a scan of the touch panel to synchronize the receive channel signal path with a group of transmit electrodes on one side of the touch panel in accordance with example embodiments of the present disclosure.

Figure 3:
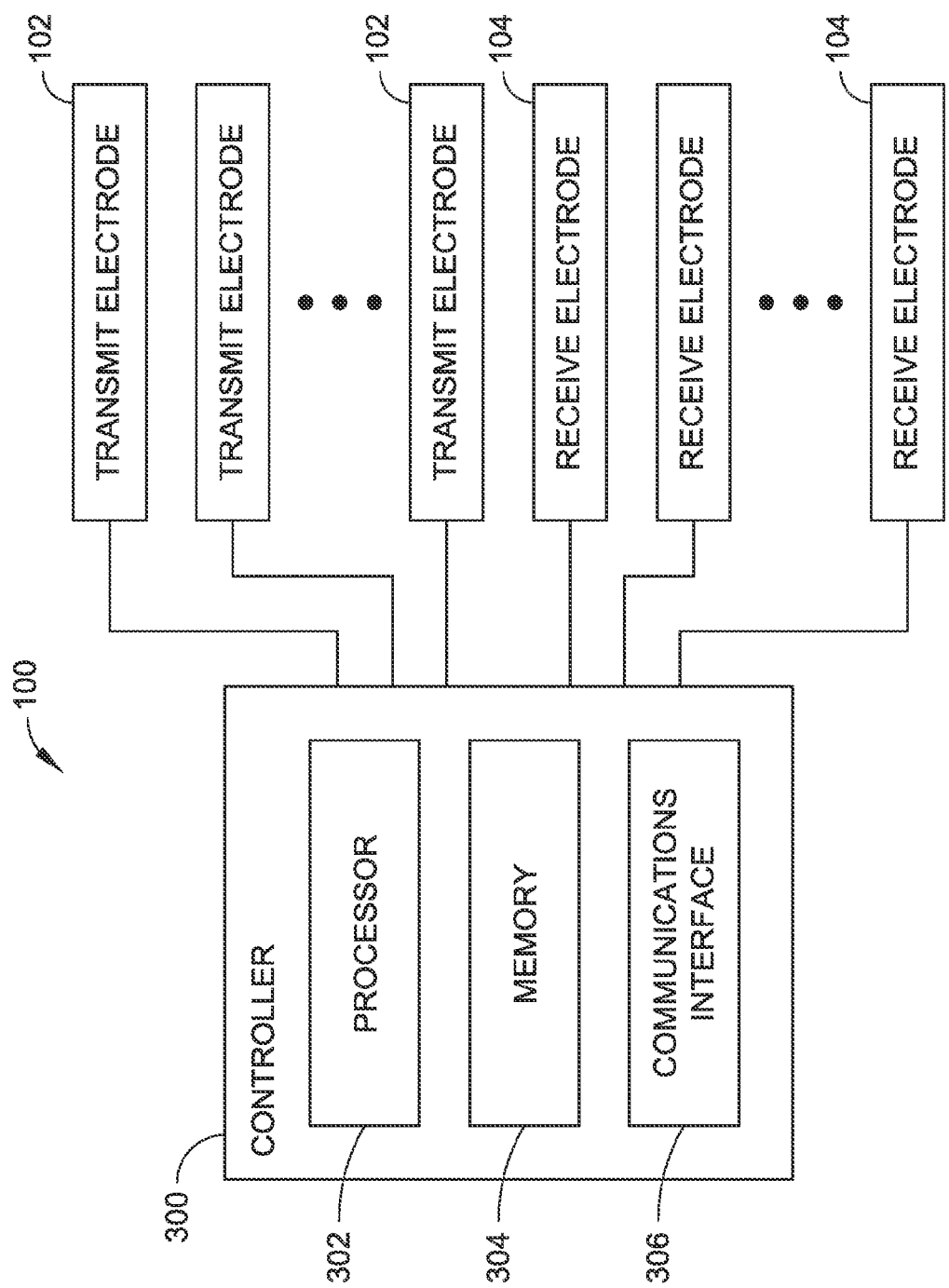

FIG. 3 is a diagrammatic illustration of a touch panel system including a touch panel with a controller for dynamically configuring transmit electrodes and receive electrodes of the touch panel to compensate for phase delays introduced by driving the transmit electrodes from different sides of the touch panel in accordance with example embodiments of the present disclosure.

Figure 4:
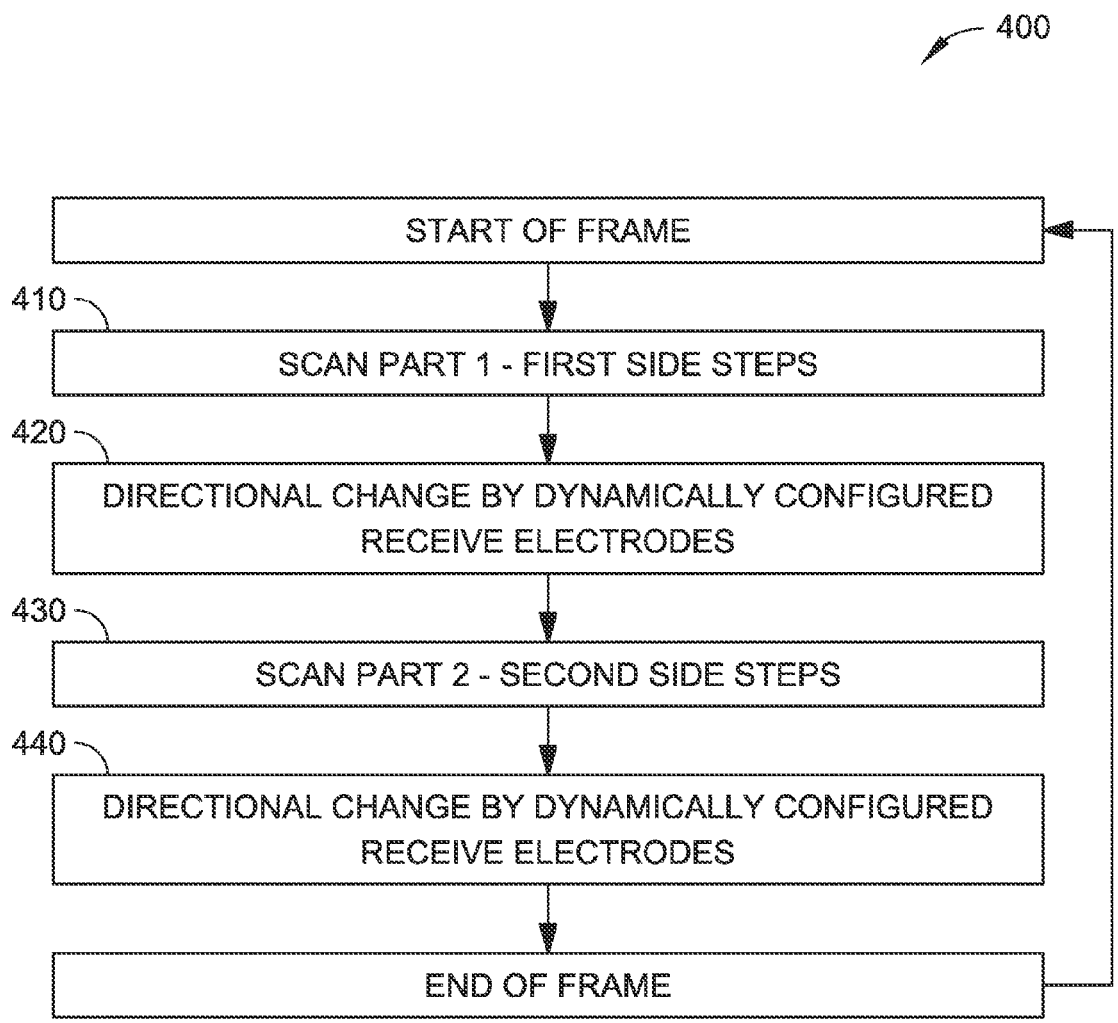

FIG. 4 is a flow diagram illustrating a method for performing a two part scan of a capacitive touch panel sensor, where the first part comprises scanning a first group of transmit electrodes driven from the first side of the touch panel, a second part comprises scanning a second group of electrodes driven from the second side of the touch panel, and where the second part of the scan is performed by dynamically configured receive electrodes that synchronize with the transmit electrodes driven from different (e.g., opposing) sides.

DETAILED DESCRIPTION

Overview

Capacitive touch panels detect capacitance changes caused by an operator touching the panel (touch event capacitance ($C_A$)), the sensor capacitance ($C_s$) of each sensor, and other environmental (e.g., parasitic) capacitances. In a mutual capacitance system, the object used to touch the panel (e.g., a finger, a conductive stylus) alters the mutual coupling between row and column electrodes. Mutual capacitance based capacitive touch panels have a phase delay between transmit (TX) and receive (RX) electrode channels. A higher phase delay can limit the possible scanning frequency (e.g., to 80 kHz or below in some cases), increasing the time required for the device to complete a scan of the touch panel. Scanning a touch panel device at a lower frequency can also expose the touch panel device to additional noise from parasitic capacitance and may present fewer options for avoiding common-mode interference (e.g., from a charger).

In touch panel devices with transmit channels driven from one side of the device, phase delay can be compensated for in the receive channels by adjusting timing of the receive channels to account for delays that occur as transmit signals are propagated across the touch panel. However, in some cases transmit channels are driven from both sides of a panel. For example, a mobile touch panel device uses transmit channels routed to both sides of a touch panel to decrease the bezel width of the device. In a correlated touch panel configuration, where receive channels employ the same transmit waveform as the drivers for transmit channels, compensation for phase delays along transmit channels driven from one side of the panel can negatively impact channels driven from an opposing side. This can limit possible scanning frequencies, as the touch panel device must be run at a low enough frequency to allow signals from the transmit channels to propagate across the receive channels.

Accordingly, systems and techniques are provided for capacitive touch panels that allow for increased touch panel scan frequency. A capacitance based capacitive touch panel with increased scan frequency, and a method of scanning a capacitive touch panel sensor that includes elongated transmit electrodes arranged proximate to one another and elongated receive electrodes arranged proximate to one another and across the elongated transmit electrodes are described. A first group of transmit electrodes are driven from a first side of the touch panel, and a second group of transmit electrodes are driven from a second side of the touch panel. A controller operates to dynamically configure the transmit electrodes and the receive electrodes to compensate for phase delays introduced by driving the transmit electrodes from different sides of the touch panel. In some embodiments, the controller operates to dynamically configure the receive electrodes to synchronize with transmit electrodes sequentially driven from different sides of the touch panel. In other embodiments, separate groups of transmit electrodes are driven simultaneously through dynamically configured corresponding sense pathways.

Example Implementations

Referring generally to FIGS. 1 and 2, capacitive touch panels 100 are described in accordance with example embodiments of the present disclosure. The capacitive touch panels 100 are configured to sense multiple inputs simultaneously, or at least substantially simultaneously. The capacitive touch panels 100 can be used to interface with electronic devices, including but not necessarily limited to: large touch panel products, all-in-one computers, mobile computing devices (e.g., hand-held portable computers, Personal Digital Assistants (PDAs), laptop computers, netbook computers, tablet computers, and so forth), mobile telephone devices (e.g., cellular telephones and smartphones), devices that include functionalities associated with smartphones and tablet computers (e.g., phablets), portable game devices, portable media players, multimedia devices, satellite navigation devices (e.g., Global Positioning System (GPS) navigation devices), e-book reader devices (eReaders), Smart Television (TV) devices, surface computing devices (e.g., table top computers), Personal Computer (PC) devices, as well as with other devices that employ touch-based human interfaces.

The capacitive touch panels 100 may comprise ITO touch panels that include transmit electrodes 102, such as X-axis and/or Y-axis cross-bar ITO drive traces/tracks, arranged next to one another (e.g., along parallel tracks, generally parallel tracks, and so forth). The transmit electrodes 102 are elongated (e.g., extending along a longitudinal axis). For example, each transmit electrode 102 extends along an axis on a supporting surface, such as a substrate of a capacitive touch panel 100. The capacitive touch panels 100 also include receive electrodes 104, such as cross-bar X-axis and/or Y-axis ITO sensor traces/tracks arranged next to one another across the transmit electrodes 102 (e.g., along parallel tracks, generally parallel tracks, and so forth). The receive electrodes 104 are elongated (e.g., extending along a longitudinal axis). For instance, each receive electrode 104 extends along an axis on a supporting surface, such as a substrate of a capacitive touch panel 100. It should be noted that an ITO touch panel is provided by way of example only and is not meant to limit the present disclosure. In other embodiments, one or more other transparent materials (e.g., Antimony Tin Oxide (ATO)), semi-transparent materials, and/or non-transparent materials (e.g., copper) are used for a transmit electrode 102 and/or a receive electrode 104 of a capacitive touch panel 100.

The transmit electrodes 102 and the receive electrodes 104 define a coordinate system where each coordinate location (pixel) comprises a capacitor formed at each junction between one of the transmit electrodes 102 and one of the receive electrodes 104. Thus, the transmit electrodes 102 are configured to connect to one or more electrical circuits and/or electronic components (e.g., one or more drivers 106) to generate a local electric field at each capacitor. A change in the local electric field generated by an instrument (e.g., input from a finger or a stylus) at each capacitor formed at a transmit electrode 102 and a receive electrode 104 causes a change (e.g., a decrease) in capacitance associated with a touch at the corresponding coordinate location. Mutual capacitance is capacitance that occurs between two charge-holding objects (e.g., conductors). In this instance, mutual capacitance is the capacitance between the transmit electrodes 102 and the receive electrodes 104 that comprise the capacitive touch panel sensor. As described above, the transmit electrodes 102 and the receive electrodes 104 comprise traces that represent the driving lines and corresponding sensing lines to detect a change in mutual capacitance due to a touch event performed over the surface of the touch panel 100.

It should also be noted that capacitive touch panels 100 as described herein are not limited to mutual capacitance sensing. For example, input from a finger or a stylus can also be sensed via self capacitance of one or more of the capacitive touch panel sensors. Self capacitance is the capacitance associated with the respective column and the respective row and represents the amount of electrical charge to be furnished to the respective column or row to raise its electrical potential by one unit (e.g., by one volt, and so on). In embodiments of the disclosure, more than one touch can be sensed at differing coordinate locations simultaneously (or at least substantially simultaneously). In some embodiments, the transmit electrodes 102 are driven by one or more of the drivers 106 in parallel, e.g., where a set of different signals are provided to the transmit electrodes 102. In other embodiments, the transmit electrodes 102 are driven by one or more of the drivers 106 in series, e.g., where each transmit electrode 102 or subset of transmit electrodes 102 is driven one at a time.

As shown in FIG. 1, a first group 108 of elongated transmit electrodes 102 arranged proximate to one another are driven from a first side 110 of a touch panel 100, and a second group 112 of elongated transmit electrodes 102 arranged proximate to one another are driven from a second side 114 of the touch panel 100. Elongated receive electrodes 104 are arranged proximate to one another across the first group 108 of elongated transmit electrodes 102 and the second group 112 of elongated transmit electrodes 102. A controller 300 (FIG. 3) is operable to dynamically configure the transmit electrodes 102 and the receive electrodes 104 to compensate for phase delays introduced by driving the transmit electrodes 102 from different sides of the touch panel 100.

In some embodiments, the controller 300 operates to dynamically configure the receive electrodes 104 to synchronize with transmit electrodes 102 sequentially driven from different sides of the touch panel 100. For example, multiple rows of transmit electrodes 102 are driven sequentially in steps, with each row corresponding to one driving step. In this example, some of the steps are driven from the first side 110 of the touch panel 100 (e.g., a first scan part) and some of the steps are driven from the second side 114 of the touch panel 100 (e.g., a second scan part). In some embodiments, the first group 108 of transmit electrodes 102 is interleaved with the second group 112 of transmit electrodes 102 (e.g., with alternating transmit electrodes 102 driven from different sides of the touch panel 100). In other embodiments, the first group 108 of transmit electrodes 102 and the second group 112 of transmit electrodes 102 are not interleaved (e.g., as shown in FIG. 1). In an example configuration with forty (40) transmit electrodes 102, twenty (20) scan steps can be driven from the first side 110 of the touch panel 100, and twenty (20) scan steps can be driven from the second side 114 of the touch panel 100. In this configuration, the controller 300 operates to dynamically configure the receive electrodes 104 to scan based upon the direction from which a transmit electrode 102 is driven in each scan step. In this manner, the timing of the receive electrodes 104 can be adjusted to compensate for phase delays of the transmit electrodes 102.

In other embodiments, different groups of transmit electrodes 102 are driven at least partially contemporaneously (e.g., simultaneously through dynamically configured corresponding sense pathways). For example, multiple rows of transmit electrodes 102 are driven simultaneously, with one sensing path dynamically configured for driving from the first side 110 and one sensing path dynamically configured for driving from the second side 114. In these simultaneous implementations, each sensing path can be used to compensate for a phase shift from a corresponding transmit electrode 102. For example, a first set of receive electrodes 104 can be configured to receive signals transmitted from the first group 108 of transmit electrodes 102, and a second set of receive electrodes 104 can be configured to receive signals from the second group 112 of transmit electrodes 102.

As described herein, dynamic configuration of the transmit electrodes 102 and receive electrodes 104 for phase delay compensation allows for increased scanning frequency. For example, in some embodiments, the scan frequency the touch panel 100 is operated at can be at least approximately four hundred kilohertz (400 kHz). However, this scan frequency is provided by way of example only and is not meant to limit the present disclosure. In other embodiments, a touch panel 100 is driven at a frequency less than four hundred kilohertz (400 kHz), greater than four hundred kilohertz (400 kHz), and so forth.

It should be noted that while two (2) groups 108 and 112 of transmit electrodes 102 are illustrated in the accompanying figures, this configuration is provided by way of example only and is not meant to limit the present disclosure. In other embodiments, more than two groups (e.g., three (3) groups, four (4) groups, and so on) of transmit electrodes 102 are used with the touch panel 100. Further, while the first side 110 and the second side 114 of the touch panel 100 are illustrated in substantially direct opposition with respect to one another in the accompanying figures, it should be noted that the second side 114 may be indirectly opposed to (e.g., next to) the first side 110, another group of transmit electrodes 102 can be driven from another side (e.g., a third side) of the touch panel 100, transmit electrodes 102 can extend in another direction (e.g., diagonally across the touch panel 100), and so forth.

Referring now to FIG. 2, circuitry for a capacitive touch panel receive channel is described. In embodiments of the disclosure, the receive channel circuitry can be reconfigured during a scan of a touch panel 100 (FIG. 1) to synchronize a receive channel signal path 200 for a group of transmit electrodes 102 on one side of the touch panel. For example, the receive channel signal path 200 includes circuitry that can be used to adjust one or more settings applied to transmit electrodes 102 from each side of a touch panel. Transmissions from one side of the touch panel can then be scanned with a receiver configuration for that particular side. In embodiments of the disclosure, during a frame switch to another (e.g., opposite) side, one or more receive channels can be reconfigured for the next side. In this manner, phase shifts on correlated waveforms can be accounted for, e.g., by synchronizing transmit driving channels with the dynamic reconfiguration of receive channels to enable phase compensation of the receivers. As described herein, the term "correlated waveforms" can refer to distinctive waveforms (e.g., sine waves) transmitted and captured simultaneously for multiple transmit electrodes 102. Thus, while two transmit electrodes 102 are shown with reference to FIG. 2, it will be appreciated that multiple transmit electrodes 102 can extend from each side of the touch panel (e.g., in the manner of the first group 108 of transmit electrodes 102 and the second group 112 of transmit electrodes 102 as described with reference to FIG. 1).

As shown in FIG. 2, the receive channel signal path 200 can comprise a first multiplexer 202 that provides an offset cancellation signal to an amplifier (e.g., a low-noise amplifier 204). For instance, the offset cancellation signal can be used to reduce and/or minimize effects of static capacitance. The low-noise amplifier 204 also receives a signal from multiple transmit electrodes 102. The low-noise amplifier 204 is coupled with a correlator 206 along with a second multiplexer 208 that provides a correlating waveform to the correlator 206. In embodiments of the disclosure, the offset cancellation signal and/or the correlating waveform can be specified by an indexed array (e.g., a lookup table), which can be used to generate a waveform (e.g., using a digital-to-analog converter (DAC), and so on). However, this circuitry is provided by way of example and is not meant to limit the present disclosure. In other embodiments, one or more capacitive touch panel receive channels can include other circuitry and/or different circuitry to dynamically configure transmit electrodes and receive electrodes to compensate for phase delays introduced by driving the transmit electrodes from different sides of a capacitive touch panel.

One or more capacitive touch panels 100 can be included with a touch screen assembly. For example, a touch screen assembly includes a display screen, such as a liquid crystal display (LCD) screen, where the sense layer and the drive layer are sandwiched between the LCD screen and a bonding layer, with a protective cover (e.g., cover glass) attached thereto. The cover glass may include a protective coating, an anti-reflective coating, and so forth. The cover glass comprises a touch surface, upon which an operator can use one or more fingers, a stylus, and so forth to input commands to the touch screen assembly. The commands can be used to manipulate graphics displayed by, for example, the LCD screen. Further, the commands can be used as input to an electronic device connected to a capacitive touch panel 100, such as a multimedia device or another electronic device (e.g., as previously described).

Referring now to FIG. 3, a capacitive touch panel 100, including some or all of its components, can operate under computer control. For example, a processor can be included with or in a capacitive touch panel 100 to control the components and functions of capacitive touch panels 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the capacitive touch panels 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The capacitive touch panel 100 can be coupled with and/or can include a controller 300 for controlling the touch panel 100 (e.g., dynamically configuring the transmit electrodes 102 and the receive electrodes 104 of the touch panel 100 to compensate for phase delays introduced by driving the transmit electrodes 102 from different sides 110 and 114 of the touch panel 100). For example, a touch panel system includes a touch panel 100 with a controller 300 for controlling the touch panel 100. The controller 300 can include a processor 302, a memory 304, and a communications interface 306. The processor 302 provides processing functionality for the controller 300 and can include any number of processors, micro-controllers, or other processing systems, and resident or external memory for storing data and other information accessed or generated by the controller 300. The processor 302 can execute one or more software programs that implement techniques described herein. The processor 302 is not limited by the materials from which it is formed or the processing mechanisms employed therein and, as such, can be implemented via semiconductor(s) and/or transistors (e.g., using electronic integrated circuit (IC) components), and so forth.

The memory 304 is an example of tangible, computer-readable storage medium that provides storage functionality to store various data associated with operation of the controller 300, such as software programs and/or code segments, or other data to instruct the processor 302, and possibly other components of the controller 300, to perform the functionality described herein. Thus, the memory 304 can store data, such as a program of instructions for operating the touch panel system (including its components), and so forth. It should be noted that while a single memory 304 is described, a wide variety of types and combinations of memory (e.g., tangible, non-transitory memory) can be employed. The memory 304 can be integral with the processor 302, can comprise stand-alone memory, or can be a combination of both.

The memory 304 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the touch panel system and/or the memory 304 can include removable integrated circuit card (ICC) memory, such as memory provided by a subscriber identity module (SIM) card, a universal subscriber identity module (USIM) card, a universal integrated circuit card (UICC), and so on.

The communications interface 306 is operatively configured to communicate with components of the touch panel system. For example, the communications interface 306 can be configured to transmit data for storage in the touch panel system, retrieve data from storage in the touch panel system, and so forth. The communications interface 306 is also communicatively coupled with the processor 302 to facilitate data transfer between components of the touch panel system and the processor 302 (e.g., for communicating inputs to the processor 302 received from a device communicatively coupled with the controller 300). It should be noted that while the communications interface 306 is described as a component of a controller 300, one or more components of the communications interface 306 can be implemented as external components communicatively coupled to the touch panel system via a wired and/or wireless connection. The touch panel system can also comprise and/or connect to one or more input/output (I/O) devices (e.g., via the communications interface 306), including, but not necessarily limited to: a display, a mouse, a touchpad, a keyboard, and so on.

The communications interface 306 and/or the processor 302 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 306 can be configured to communicate with a single network or multiple networks across different access points.

Example Process

Referring now to FIG. 4, a procedure 400 is described in an example embodiment in which a first group of transmit electrodes is driven from a first side of a capacitive touch panel, a second group of transmit electrodes is driven from a second side of the capacitive touch panel, and the transmit electrodes and receive electrodes are dynamically configured to compensate for phase delays introduced by driving the transmit electrodes from different sides of the capacitive touch panel. For example, a two part scan of a capacitive touch panel sensor is performed. In a first scan part, transmit electrodes driven from the first side of the touch panel are scanned (e.g., by receive electrodes) (Block 410). The receive electrodes are dynamically configured to synchronize to the direction from which the transmit electrodes are driven (Block 420). In a second scan part, transmit electrodes driven from a second side of the touch panel (e.g., a side opposite the first side) are scanned (Block 430). Then, the receive electrode channels can be dynamically configured to synchronize to the direction from which the transmit electrodes are driven (e.g., in preparation for another two part scan) (Block 440). In this manner, the transmit electrodes can be driven from both sides of the panel while phase delay along the transmit electrode channels is compensated for by the configuration of the receive electrodes. It should be noted that while Block 440 is shown between Block 430 and the End of Frame block in FIG. 4, this sequence is provided by way of example and is not meant to limit the present disclosure. Thus, in other embodiments, Block 440 may be performed between the Start of Frame block and Block 410, and so forth.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system, comprising:
a first plurality of elongated transmit electrodes arranged proximate to one another and configured to be driven from a first side of a capacitive touch panel;
a second plurality of elongated transmit electrodes arranged proximate to one another and configured to be driven from a second side of the capacitive touch panel;
a plurality of elongated receive electrodes arranged proximate to one another across the first plurality of elongated transmit electrodes and the second plurality of elongated transmit electrodes; and
a controller operatively coupled with the first plurality of elongated transmit electrodes, the second plurality of elongated transmit electrodes, and the plurality of elongated receive electrodes, the controller operable to dynamically configure the first plurality of elongated transmit electrodes, the second plurality of elongated transmit electrodes, and the plurality of elongated receive electrodes to compensate for phase delays introduced by driving the first plurality of elongated transmit electrodes and the second plurality of elongated transmit electrodes from the first side of the capacitive touch panel and the second side of the capacitive touch panel, respectively, wherein dynamically configuring the plurality of elongated receive electrodes involves configuring the plurality of elongated receive electrodes to scan based upon the side of the capacitive touch panel from which a transmit electrode is driven in each scan step of a plurality of scan steps.

2. The system as recited in claim 1, wherein the capacitive touch panel is operated at a scanning frequency of at least approximately four hundred kilohertz (400 kHz).

3. The system as recited in claim 1, wherein the first plurality of elongated transmit electrodes is interleaved with the second plurality of elongated transmit electrodes.

4. The system as recited in claim 1, wherein the first plurality of elongated transmit electrodes is driven from the first side of the capacitive touch panel during a first time interval, and the second plurality of elongated transmit electrodes is driven from the second side of the capacitive touch panel during a second time interval.

5. The system as recited in claim 4, wherein the second time interval is subsequent to the first time interval.

6. The system as recited in claim 4, wherein the first time interval and the second time interval are at least partially contemporaneous.

7. The system as recited in claim 6, wherein the controller is operable to dynamically configure a first group of receive electrodes of the plurality of receive electrodes to compensate for phase delays introduced by driving the first plurality of elongated transmit electrodes from the first side of the capacitive touch panel, and the controller is operable to dynamically configure a second group of receive electrodes of the plurality of receive electrodes to compensate for phase delays introduced by driving the second plurality of elongated transmit electrodes from the second side of the capacitive touch panel.

8. A method comprising:
driving a first plurality of elongated transmit electrodes arranged proximate to one another from a first side of a capacitive touch panel;
driving a second plurality of elongated transmit electrodes arranged proximate to one another from a second side of the capacitive touch panel; and
dynamically configuring the first plurality of elongated transmit electrodes, the second plurality of elongated transmit electrodes, and a plurality of elongated receive electrodes arranged proximate to one another across the first plurality of elongated transmit electrodes and the second plurality of elongated transmit electrodes to compensate for phase delays introduced by driving the first plurality of elongated transmit electrodes and the second plurality of elongated transmit electrodes from the first side of the capacitive touch panel and the second side of the capacitive touch panel, respectively, wherein dynamically configuring the plurality of elongated receive electrodes involves configuring the plurality of elongated receive electrodes to scan based upon the side of the capacitive touch panel from which a transmit electrode is driven in each scan step of a plurality of scan steps.

9. The method as recited in claim 8, the capacitive touch panel is operated at a scanning frequency of at least approximately four hundred kilohertz (400 kHz).

10. The method as recited in claim 8, the first plurality of elongated transmit electrodes is interleaved with the second plurality of elongated transmit electrodes.

11. The method as recited in claim 8, wherein the first plurality of elongated transmit electrodes is driven from the first side of the capacitive touch panel during a first time interval, and the second plurality of elongated transmit electrodes is driven from the second side of the capacitive touch panel during a second time interval.

12. The method as recited in claim 11, wherein the second time interval is subsequent to the first time interval.

13. The method as recited in claim 11, wherein the first time interval and the second time interval are at least partially contemporaneous.

14. The method as recited in claim 13, wherein dynamically configuring the plurality of elongated receive electrodes to compensate for phase delays introduced by driving the first plurality of elongated transmit electrodes and the second plurality of elongated transmit electrodes from the first side of the capacitive touch panel and the second side of the capacitive touch panel, respectively, comprises dynamically configuring a first group of receive electrodes of the plurality of receive electrodes to compensate for phase delays introduced by driving the first plurality of elongated transmit electrodes from the first side of the capacitive touch panel, and the controller is operable to dynamically configure a second group of receive electrodes of the plurality of receive electrodes to compensate for phase delays introduced by driving the second plurality of elongated transmit electrodes from the second side of the capacitive touch panel.

15. A capacitive touch panel, comprising:
a first plurality of elongated transmit electrodes arranged proximate to one another and configured to be driven from a first side of the capacitive touch panel;
a second plurality of elongated transmit electrodes arranged proximate to one another and configured to be driven from a second side of the capacitive touch panel;
a receive electrode arranged across the first plurality of elongated transmit electrodes and the second plurality of elongated transmit electrodes; and
receive channel signal path circuitry coupled with the receive electrode, the receive channel signal path circuitry operable to dynamically configure the receive electrode to compensate for phase delays introduced by driving the first plurality of elongated transmit electrodes and the second plurality of elongated transmit electrodes from the first side of the capacitive touch panel and the second side of the capacitive touch panel, respectively, wherein the first plurality of elongated transmit electrodes is driven from the first side of the capacitive touch panel during a first time interval, and the second plurality of elongated transmit electrodes is driven from the second side of the capacitive touch panel during a second time interval, wherein dynamically configuring the plurality of elongated receive electrodes involves configuring the plurality of elongated receive electrodes to scan based upon the side of the capacitive touch panel from which a transmit electrode is driven in each scan step of a plurality of scan steps.

16. The capacitive touch panel as recited in claim 15, wherein the receive channel signal path comprises a correlator coupled with a multiplexer configured to receive a correlating waveform and an amplifier configured to receive a signal from at least one of the first plurality of elongated transmit electrodes and the second plurality of elongated transmit electrodes.

17. The capacitive touch panel as recited in claim 15, wherein the second time interval is subsequent to the first time interval.

18. The capacitive touch panel as recited in claim 15, wherein the first time interval and the second time interval are at least partially contemporaneous.

19. The capacitive touch panel as recited in claim 15, wherein the capacitive touch panel is operated at a scanning frequency of at least approximately four hundred kilohertz (400 kHz).

20. The capacitive touch panel as recited in claim 15, wherein the first plurality of elongated transmit electrodes is interleaved with the second plurality of elongated transmit electrodes.

* * * * *